(12) United States Patent
Acreman et al.

(10) Patent No.: US 10,768,490 B2
(45) Date of Patent: Sep. 8, 2020

(54) LIQUID CRYSTAL DISPLAY DEVICE WITH PATTERNED ALIGNMENT LAYER FOR IMPROVED BRIGHTNESS

(71) Applicant: Sharp Kabushiki Kaisha, Osaka (JP)

(72) Inventors: Andrew Acreman, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/019,653

(22) Filed: Jun. 27, 2018

(65) Prior Publication Data

US 2020/0004065 A1    Jan. 2, 2020

(51) Int. Cl.
  *G02F 1/13*     (2006.01)
  *G02F 1/1343*   (2006.01)
  *G02F 1/1337*   (2006.01)
  *G09G 3/36*     (2006.01)

(52) U.S. Cl.
  CPC .......... *G02F 1/1343* (2013.01); *G02F 1/1337* (2013.01); *G09G 3/36* (2013.01); *G02F 2001/134372* (2013.01); *G02F 2201/123* (2013.01)

(58) Field of Classification Search
  None
  See application file for complete search history.

(56) References Cited

U.S. PATENT DOCUMENTS

| 5,861,931 A | 1/1999 | Gillian et al. |
| 5,953,091 A | 9/1999 | Jones et al. |
| 2005/0270462 A1* | 12/2005 | Koma .............. G02F 1/133753 349/129 |

FOREIGN PATENT DOCUMENTS

JP    2017211566    11/2017

OTHER PUBLICATIONS

Sato et al.: "An in-plane Switching Liquid Crystal Cell With Weakly Anchored Liquid Crystals on the Electrode Substrate" Journal of Materials Chemistry C, 2017.5.4384-4387.

* cited by examiner

*Primary Examiner* — Joseph R Haley
(74) *Attorney, Agent, or Firm* — Renner, Otto, Boisselle & Sklar, LLP

(57) ABSTRACT

A liquid crystal device (LCD) has improved brightness by the use of a patterned alignment structure. The LCD includes a liquid crystal (LC) layer; an electrode arrangement configured to apply an electric field to the LC layer, the electrode arrangement including a patterned electrode layer having a plurality of individual electrode elements and adjacent individual electrode elements are spaced apart from each other by an inter-electrode gap; and a patterned alignment structure that is deposited on the patterned electrode layer and is positioned to align LC molecules of the LC layer. The patterned alignment structure is configured such that a stronger anchoring energy is present at electrode edges of the individual electrode elements of the patterned electrode layer, as compared to a weaker anchoring energy present at electrode centers of the individual electrode elements and/or present at least at a portion of the inter-electrode gaps between adjacent individual electrode elements.

20 Claims, 9 Drawing Sheets

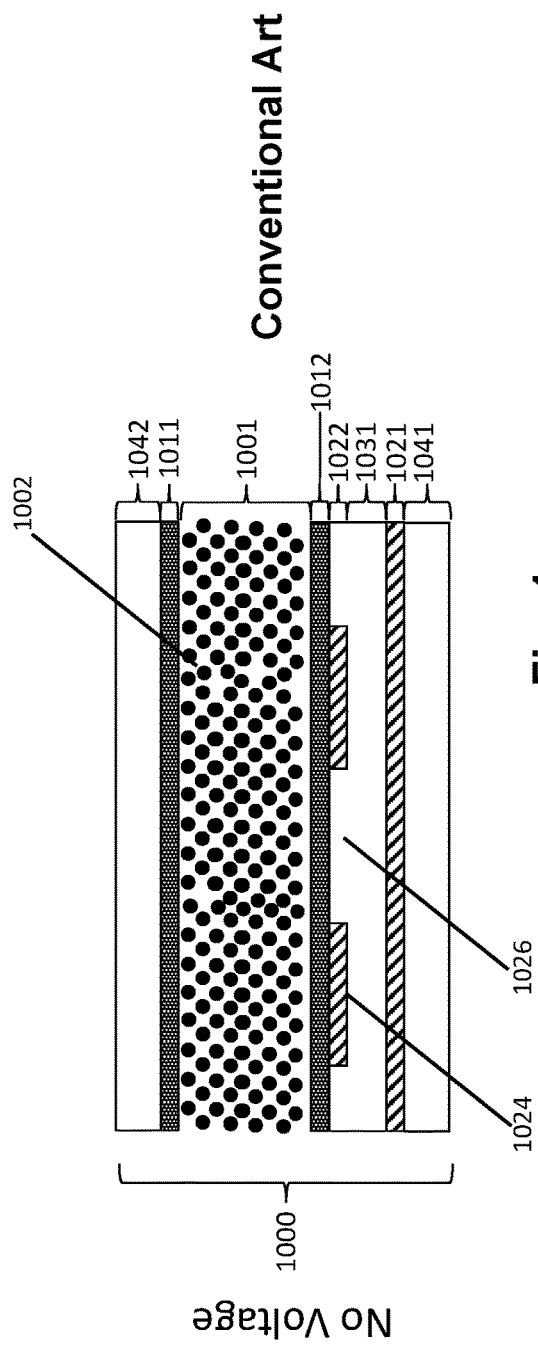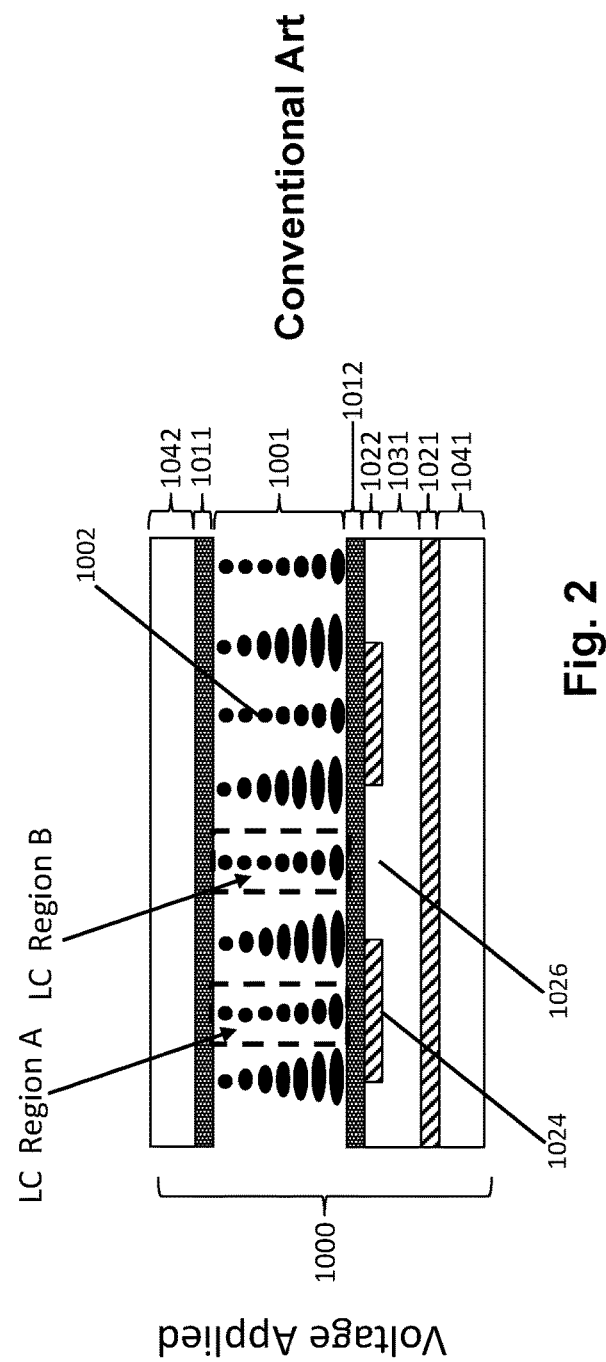

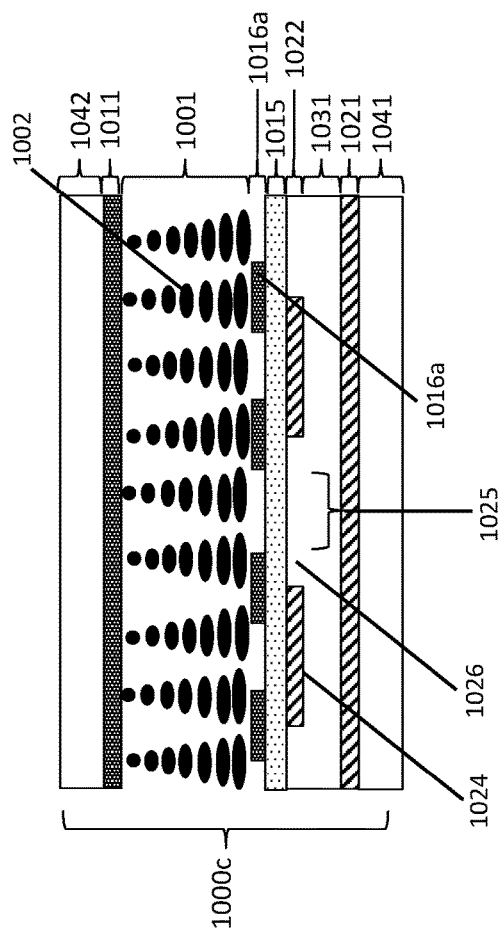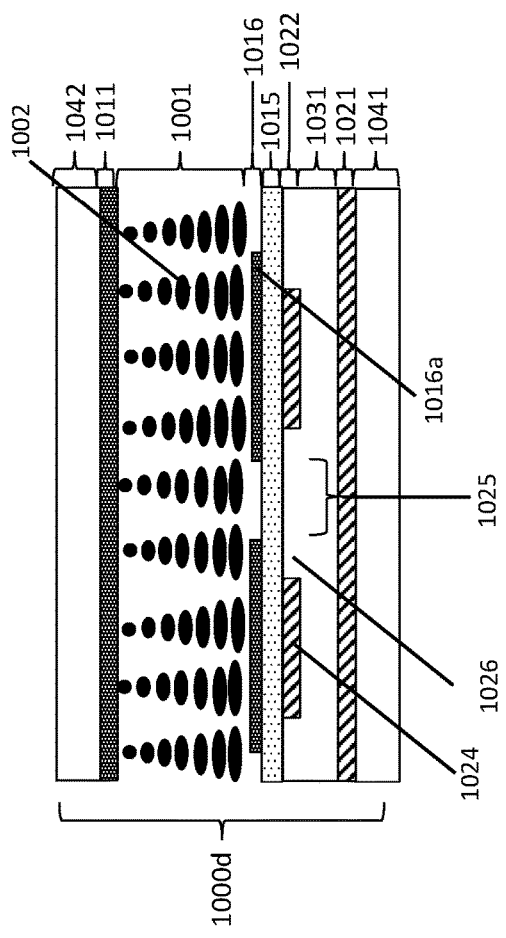

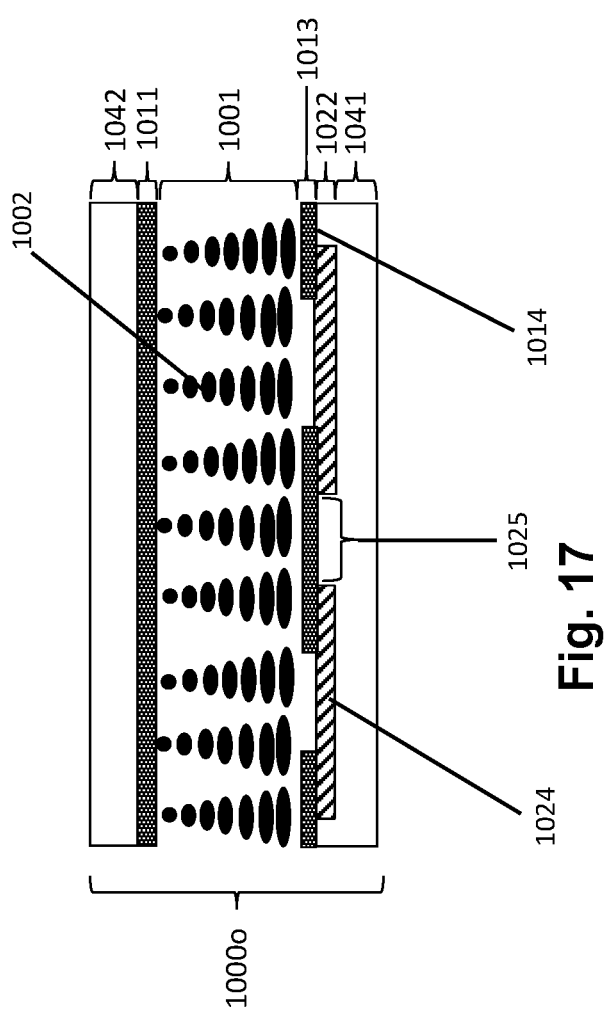

LIQUID CRYSTAL DISPLAY DEVICE WITH PATTERNED ALIGNMENT LAYER FOR IMPROVED BRIGHTNESS

TECHNICAL FIELD

The present invention relates to liquid crystal display devices, and more particularly to in-plane switching display devices that include in-plane switching (IPS) and fringe field switching (FFS) device modes, including systems and methods for improving brightness of such display devices.

BACKGROUND ART

Liquid crystal display devices (LCDs), including in-plane switching (IPS) and fringe field switching (FFS) LCD modes, are common and used in a variety of display applications. In such devices, a liquid crystal (LC) layer is provided between two alignment layers that operate to align the LC molecules with a particular alignment, such as horizontal or vertical. The strength or stability of the alignment of the LC molecules may be characterized by the alignment or anchoring energy of the alignment layer applied to the LC molecules. To generate different light transmission from the LC layer, a voltage is applied to the electrode which generates an electric field which applies a force to the LC layer, which can overcome the anchoring or alignment energy of at least of portion of the LC molecules to re-align said LC molecules. When the voltage is removed, the LC molecules will relax (re-orient) back to the alignment dictated by the alignment layers, and the time for such relaxation (re-orientation) commonly is referred to as the off-time.

Attempts have been made to improve LCD operation by modification of the alignment layers. For example, JP 2017-211566 (Maeda et al., published Nov. 30, 2017) describes a display system in which the alignment layers are patterned in a manner whereby the anchoring energy above the electrodes is lower than the anchoring energy directly above the inter-electrode gaps. This is done to lower the operating voltage of the device. Increasing the anchoring energy above the inter-electrode gaps, however, can lead to a brightness reduction, as the re-alignment in response to the electrode voltage is reduced in the inter-electrode gaps due to a combination of; a smaller electric field magnitude in the inter electrode gaps as well as the higher anchoring energy at the inter-electrode gaps.

A similar effect of lowering the operating voltage can be achieved by using a uniform weak alignment layer, as disclosed in an article to Sato et al. ("*An in-plane Switching Liquid Crystal Cell With Weakly Anchored Liquid Crystals On the Electrode Substrate*" Journal of Materials Chemistry C, 2017.5.4384-4387). However, while this configuration can increase the brightness and decrease the operating voltage, the on and off switching times to re-orient the LC molecules of the display upon application and removal of the voltage are increased, which reduces the overall performance of the display system.

Other adjustments to alignment layers have been used to improve aspects of display performance. For example, U.S. Pat. No. 5,953,091 (Jones et al., issued Sep. 14, 1999) discloses a display system in which the alignment direction of an LCD is patterned to induce a multi-domain pixel. U.S. Pat. No. 5,861,931 (Gillian et al., issued Jan. 19, 1999) discloses a display system in which the alignment direction of an alignment layer is patterned in a manner to induce different director orientations in an LC layer to create a patterned polarization rotator. Such configurations do not relate to improving brightness issues whiling maintain effective switching times.

SUMMARY OF INVENTION

The present disclosure describes a structural change to an in-plane switching LCD (for instance a display capable of FFS and IPS modes) to improve the homogeneity of the reorientation of the liquid crystal molecules, and consequently to increase the brightness of the in-plane switching LCD. This is achieved by patterning the alignment structure on the pixel electrode layer in such a manner as to encourage uniform switching of the orientation of the liquid crystal molecules. Specifically, the alignment structure patterning is configured in a manner so as to increase the in-plane reorientation of the liquid crystal molecules directly above or at the centers of the electrode elements and/or above or at the inter-electrode gaps equidistant between the electrode elements, relative to the reorientation at the electrode edges to provide a uniform alignment of the LC molecules in response to application of the voltage to the electrode arrangement.

As referenced above as an example of the conventional art, in JP 2017-211566 the alignment layers are patterned in a manner whereby the anchoring energy above the electrodes is lower than the anchoring energy directly above the inter-electrode gaps. The configuration of the present disclosure contrasts in that the anchoring energy is weaker at the inter-electrode gaps to increase brightness (opposite from JP 2017-211566), and thus circumvents the downside effects on brightness of conventional configurations by maintaining areas of strong anchoring energy at the electrode edges. In this regard, because the anchoring energy of the alignment layer is still strong at the electrode edges, the configurations of the present disclosure also do not suffer from issues of long switching times such as experienced with the use of weak alignment layers as taught in the article to Sato et al. Configurations of the present disclosure may be used with a liquid crystal layer that has positive dielectric anisotropy, or with a liquid crystal layer that has negative dielectric anisotropy.

An aspect of the invention, therefore, is liquid crystal device (LCD) with improved brightness by the use of a patterned alignment structure. In exemplary embodiments, the LCD includes a liquid crystal (LC) layer; an electrode arrangement configured to apply an electric field to the LC layer, the electrode arrangement including a patterned electrode layer having a plurality of individual electrode elements and adjacent individual electrode elements are spaced apart from each other by an inter-electrode gap; and a patterned alignment structure that is deposited on the patterned electrode layer and is positioned to align LC molecules of the LC layer. The patterned alignment structure is configured such that a stronger anchoring energy is present at electrode edges of the individual electrode elements of the patterned electrode layer, as compared to a weaker anchoring energy present at electrode centers of the individual electrode elements and/or present at least at a portion of the inter-electrode gaps between adjacent individual electrode elements. While the majority of the figures demonstrate the aspects of the invention with regard to a fringe field switching mode (FFS), it will be understood to one of ordinary skill in the art that the same process can be applied to an in-plane switching mode (IPS) LCD.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 is a schematic drawing depicting a liquid crystal device (LCD) configuration as is conventional in the art, in a state in which no voltage is applied.

FIG. 2 is a schematic drawing depicting the LCD of FIG. 1, in a state in which a voltage is applied to illustrate the problem addressed by the present disclosure.

FIG. 5 is a schematic drawing depicting an enhanced LCD, including a third configuration of a patterned alignment structure.

FIG. 6 is a schematic drawing depicting an enhanced LCD, including a fourth configuration of another patterned alignment structure.

FIG. 17 is a schematic drawing depicting an enhanced LCD with another alternative of a patterned alignment for use in an IPS mode LCD.

DESCRIPTION OF EMBODIMENTS

Figure 3:
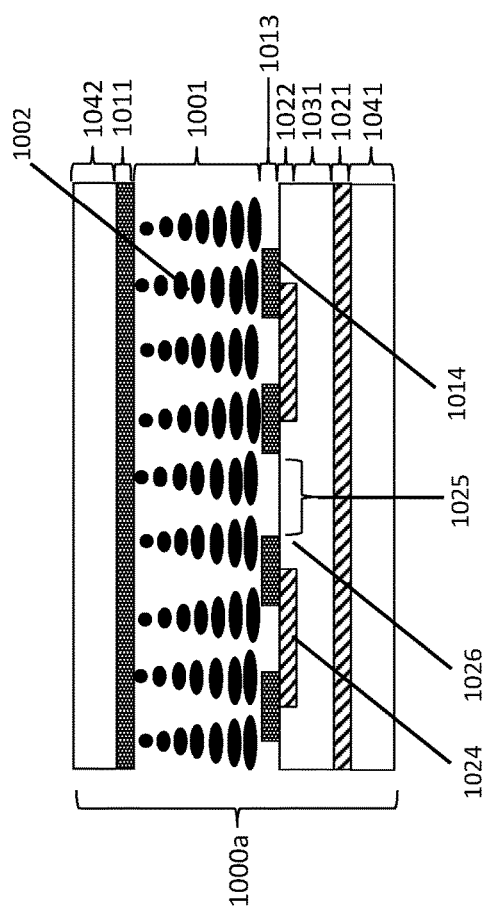
FIG. 3 is a schematic drawing depicting an enhanced LCD, including a first configuration of a patterned alignment structure.

Embodiments of the present invention will now be described with reference to the drawings, wherein like reference numerals are used to refer to like elements throughout. It will be understood that the figures are not necessarily to scale.

FIG. 1 is a schematic drawing depicting a liquid crystal device (LCD) 1000 configuration as is conventional in the art, in a state in which no voltage is applied. The LCD 1000 may include a liquid crystal (LC) layer 1001 including liquid crystal molecules 1002 that are sandwiched between a first alignment layer 1011 and a second alignment layer 1012. The LCD further includes an electrode arrangement configured to apply an electric field to the LC layer. The LCD 1000 has an in-plane switching configuration in which the opposing electrodes of the electrode arrangement are on a common side of the LC layer 1001. In particular, the electrode arrangement includes a common electrode layer 1021 and a patterned pixel electrode layer 1022 that are spaced apart by an insulator layer 1031. The pixel electrode layer 1022 is a patterned electrode layer that includes a plurality of individual electrode elements 1024, and adjacent individual electrodes are spaced apart from each other by inter-electrode gaps 1026. In addition, the pixel electrode layer 1022 is adjacent to one of the alignment layers, e.g., the second alignment layer 1012. The LCD 1000 further may include a thin film transistor (TFT) substrate 1041 that includes drive electronics for applying a voltage to the electrode arrangement to generate the electric field applied to the LC layer 1001 for re-orientation of the LC molecules 1002 to achieve the desired light emission. The LCD 1000 further may include additional optical layers, such as for example any suitable polarizers, brightness enhancement films, diffusers, and the like as may be suitable for any particular display application. In this example, a color filter substrate 1042 for controlling output color is shown, although again the display configuration may include any suitable combination of optical elements.

FIG. 2 is a schematic drawing depicting the LCD 1000 of FIG. 1, in a state in which an electric field is applied to the LC layer 1001 via application of a voltage to the electrode arrangement. In absence of the voltage (FIG. 1), the two alignment layers operate to align the LC molecules with a particular alignment, such as horizontal or vertical. The strength or stability of the alignment of the LC molecules may be characterized by the alignment or anchoring energy of the alignment layers applied to the LC molecules, which exerts essentially a "dragging" force that resists re-orientation of the LC molecules away from the initial state dictated by the alignment layers. To modulate the light transmission of the LC layer, the electrode arrangement applies an electric field to the LC layer 1001, which overcomes the dragging force of the anchoring or alignment energy to reorient the LC molecules 1002, which is depicted in FIG. 2. As seen in FIG. 2, with the in-plane switching configuration (there are IPS and FFS modes), the re-orientation of the LC molecules is greatest with proximity to the pixel electrode layer 1022 (adjacent to the second alignment layer 1012), decreasing in the thickness direction toward the first alignment layer 1011. When the voltage is removed, the LC molecules will re-orient back to the configuration of FIG. 1 with the alignment dictated by the dragging force applied by the anchoring energy of the alignment layers. A switching time denotes the time it takes to reorient the LC molecules, which may include an "on-time" for re-orientation upon application of the electric field to the LC layer, and an "off-time" for re-orientation back to the state dictated by the alignment layers when the electric field is removed.

Generally, those of ordinary skill in the art refer to a "strong" alignment layer as having an anchoring energy on the order of $10^{-3}$ to about $10^{-2}$ J/m$^2$, and a "weak" alignment layer as having an anchoring energy on the order of $10^{-3}$ to $10^{-6}$ J/m$^2$ or less (and which can be zero). In the conventional configuration of FIG. 2, at least the second alignment layer 1012 associated with the pixel electrode layer 1022 is a strong alignment layer. FIG. 2 illustrates an issue with conventional in-plane switching configurations, whereby when a voltage is applied to the electrode arrangement, the re-orientation of the LC molecules 1002 is not homogenous or uniform.

The electric field generated at the individual electrode elements 1024 is strongest at the electrode edges, and the electric field is weaker both above the electrode centers and at the inter-electrode gaps 1026. Accordingly, the re-orientation of the LC molecules 1002 is less pronounced over the centers of the electrode elements 1024, as denoted by LC Region A in FIG. 2. The re-orientation of the LC molecules 1002 also is less pronounced between the individual electrode elements 1024 at the inter-electrode gaps 1026 away from the electrode edges, as shown by LC Region B in FIG. 2. This non-uniformity occurs because the fringe fields that reorient the LC molecules 1002 are strongest at the edges of the electrode elements and decay exponentially away from these edges. The weaker electric field areas in turn cannot overcome the anchoring energy to as great an extent as at the electrode edges, and thus the orientation of LC molecules 1002 in these areas (Regions A and B of FIG. 2) tends to remain closer to the alignment as dictated by the second alignment layer 1012 when the electric field is absent.

The result of the non-uniformity in re-orientation of the LC molecules 1002 is a lower brightness, which of course is problematic for display devices. Conventional display configurations do not address this problem, and may even exacerbate the brightness decrease. For example, JP 2017-211566 teaches to increase the anchoring energy above the inter-electrode gaps relative to above the electrodes to attempt to lower the operating energy, but this can render the non-uniformity even more pronounced by less re-orientation of the LC molecules above the inter-electrode gaps. Sato et al. teaches the use of a continuous, un-patterned weak alignment layer on the pixel electrode layer, but the use of a weak alignment layer can result in significant downsides including an increase in both the switching times, i.e., increased on-time and off-time.

Embodiments of the present disclosure overcome such deficiencies by incorporating a patterned alignment structure in the LCD configuration that is deposited on the patterned pixel electrode layer and positioned to align the LC molecules of the LC layer. The patterned alignment structure is configured such that a stronger anchoring energy is present above or at the electrode edges of the individual electrode elements of the patterned electrode layer, as compared to a weaker anchoring energy present above or at electrode centers of the individual electrode elements and/or above at least a portion of the inter-electrode gaps between adjacent individual electrode elements. In this manner, a weaker anchoring energy is present in regions in which the electric field tends to be weaker, and thus a more uniform re-orientation of the LC molecules is achieved as the dragging force against re-orientation by the alignment layer is reduced where the electric field tends to be lower.

The enhanced uniformity of re-orientation improves brightness of the LCD as compared to conventional configurations. In addition, the switching times, including both the on-time and off-time, remain sufficiently short for effective performance. As to the on-time, the regions of weaker anchoring energy permit efficient re-orientation of the LC molecules when the voltage is applied comparably as to the regions of stronger anchoring energy, insofar as resistance to re-orientation is reduced in the regions of weaker anchoring energy. As to the off-time, when the voltage is removed reversion of alignment of the LC molecules in the regions of stronger anchoring energy tends to pull or drive reversion of alignment of the LC molecules in the adjacent regions of weaker anchoring energy, thereby maintaining an efficient off-time. The enhanced configurations of the present disclosure may be used with a liquid crystal that has positive dielectric anisotropy, or with a liquid crystal that has negative dielectric anisotropy.

An aspect of the invention, therefore, is liquid crystal device (LCD) with improved brightness by the use of a patterned alignment structure. In exemplary embodiments, the LCD includes a liquid crystal (LC) layer; an electrode arrangement configured to apply an electric field to the LC layer, the electrode arrangement including a patterned electrode layer having a plurality of individual electrode elements and adjacent individual electrode elements are spaced apart from each other by an inter-electrode gap; and a patterned alignment structure that is deposited on the patterned electrode layer and is positioned to align LC molecules of the LC layer. The patterned alignment structure is configured such that a stronger anchoring energy is present at electrode edges of the individual electrode elements of the patterned electrode layer, as compared to a weaker anchoring energy present at electrode centers of the individual electrode elements and/or present at least at a portion of the inter-electrode gaps between adjacent individual electrode elements.

The various figures depict examples of enhanced LCDs including different configurations of patterned alignment structures adjacent to the pixel electrode layer. As to elements of the LCDs that are comparable as in the conventional LCD of FIGS. 1 and 2, like reference numerals are used to identify such comparable components.

FIG. 3 is a schematic drawing depicting an enhanced LCD 1000a, including a first configuration of a patterned alignment structure adjacent to the pixel electrode layer 1022. In the example of FIG. 3, the patterned alignment structure is configured as a single patterned alignment layer 1013. Specifically, the patterned alignment layer 1013 includes a plurality of individual alignment elements 1014. The patterned alignment layer 1013 may be a strong alignment layer in which each of the plurality of individual alignment elements 1014 has a strong anchoring energy as understood to those of ordinary skill in the art (on the order of $10^{-3}$ to $10^{-2}$ J/m$^2$ or more), each of which is positioned above or at edges of the individual electrode elements 1024 of the patterned pixel electrode layer 1022. In this manner, each individual alignment element 1014 spans an edge of an individual electrode element 1024, and adjacent individual alignment elements 1014 are spaced apart from each other as seen in FIG. 3.

In addition, there is an absence of individual alignment elements 1014 at the centers of the individual electrode elements and/or the portion of the inter-electrode gaps between adjacent individual electrode elements. Referring to FIG. 3, there is no alignment layer or element of an alignment layer 1014 above either centers of the electrode elements 1024, nor above portions 1025 of the inter-electrode gaps 1026. In exemplary embodiments, opposing boundaries of the portions 1025 of the inter-electrode gaps 1026 above which there is no alignment layer are equidistant from edges of adjacent electrode elements 1024. As referenced above, the configuration of FIG. 3 results in stronger anchoring energy being present at the electrode edges as compared to a weaker anchoring energy present at the electrode centers and/or above a portion of the inter-electrode gaps between adjacent electrode edges, so as to provide a weaker anchoring energy in regions in which the electric field tends to be weaker (i.e., Region A and Region B depicted in FIG. 2). In this manner, the described uniformity of re-orientation of the LC molecules occurs to enhance brightness as compared to conventional configurations, while maintaining efficient switching times.

Figure 4:
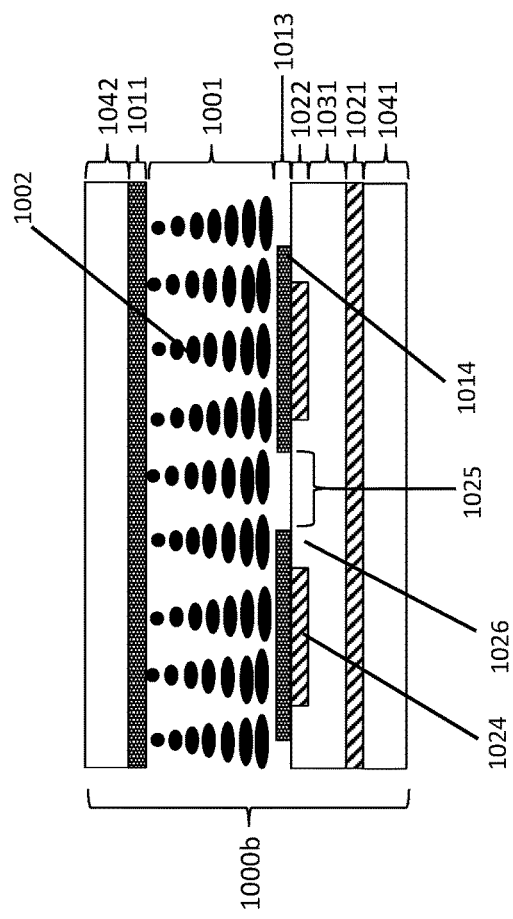
FIG. 4 is a schematic drawing depicting an enhanced LCD, including a second configuration of another patterned alignment structure.

FIG. 4 depicts an enhanced LCD 1000b including a second configuration of a patterned alignment structure that is variation on the embodiment of FIG. 3, in which the absence of alignment elements 1014 of the alignment layer 1013 is limited to the portions 1025 of the inter-electrode gaps 1026. Accordingly, each individual alignment element 1014 spans an entirety of an individual electrode element 1024, and there is an absence of individual alignment elements 1014 only at the portion 1025 of the inter-electrode gaps 1026 between adjacent individual electrode elements. With this configuration, the patterning of the alignment layer 1013 is such that there is no alignment layer in areas equidistant between the pixel electrode elements. The configuration of FIG. 4 may be preferred to that of FIG. 3 in configurations in which a width of the electrode elements 1024 is sufficiently small. Essentially, as the width of an electrode element becomes progressively smaller, the electrode center becomes closer to the electrode edges such that the weakening of the electric field at the electrode center relative to the electrode edges becomes minimal. With a stronger electric field across the entire electrode elements, the re-orientation of the LC molecules above the electrode elements becomes more uniform. Consequently, it may be more cost effective to pattern only the alignment layer within the inter-electrode gaps as illustrated in FIG. 4.

For example, if the electrode width were 4 μm and the electrode gap were 3 μm, it may be necessary to pattern the alignment layer (1013) as shown in FIG. 3. However, if the electrode width were 0.5 μm and the electrode gap were 3 μm, it may be sufficient to pattern the alignment layer in a manner shown in FIG. 4. When the electrode gap is substantively smaller that the electrode width (in contrast to what is shown in FIG. 4), it alternatively may be sufficient to pattern the alignment layer so that there are gaps in the alignment layers over the center of the electrodes while the alignment layers are continuous over the inter-electrode gaps.

In exemplary embodiments, the patterned alignment structure is configured as a dual alignment layer structure including an un-patterned alignment layer and a patterned alignment layer. The patterned alignment layer includes a plurality of individual alignment elements and adjacent individual alignment elements are spaced apart from each other. The un-patterned alignment layer may be deposited directly on the patterned electrode layer, and the patterned alignment layer may be deposited directly on the un-patterned alignment layer on a side of the un-patterned alignment layer opposite from the patterned electrode layer.

FIG. 5 is a schematic drawing depicting an enhanced LCD 1000c, including a third configuration of a patterned alignment structure adjacent to the pixel electrode layer 1022. In the example of FIG. 5, the patterned alignment structure is configured as a dual alignment layer structure including an un-patterned, uniform and continuous weak alignment layer 1015 deposited on the pixel electrode layer 1022, and a patterned strong alignment layer 1016 including a plurality of strong alignment layer elements 1016a deposited on the weak alignment layer 1015. Accordingly, the un-patterned alignment layer has a weaker anchoring energy relative to a stronger anchoring energy of the patterned alignment layer. For reference and illustration, in the figures stronger alignment layers are shaded darker relative to weaker alignment layers. Each individual alignment element 1016a of the patterned alignment layer 1016 spans an edge of an individual electrode element 1024 of the patterned pixel electrode layer 1022, and there is an absence of individual alignment elements 1016a at the centers of the individual electrode elements 1024 and/or the portion 1025 of the inter-electrode gaps 1026 between adjacent individual electrode elements. In this manner, the patterning of the strong alignment layer 1016 bears similarity to the patterning of the alignment layer 1013 in the embodiment of FIG. 3, with the patterned strong alignment layer 1016 of FIG. 5 being deposited on the additional weak alignment layer 1015 that is not present in the embodiment of FIG. 3.

In certain display configurations, the total absence of an alignment layer at portions of the LC layer can cause degradation in quality of the black state and relatedly increase the off-time in a significant manner, insofar as there is no alignment layer in these regions to aid in the re-orientation of the LC molecules back to the initial state when the electric field is removed. With combining a patterned strong alignment layer and a uniform weak alignment layer as illustrated in FIG. 5, the benefit of the configuration of FIG. 3 of uniform re-orientation of the LC molecules still is achieved, but with an improved off-time by operation of the weak alignment layer to aid in the re-orientation of the LC molecules back to the initial state when the electric field is removed. Such configuration may be particularly beneficial for use in an LCD in which the liquid crystal has positive dielectric anisotropy, and the configuration also may be used in an LCD in which the liquid crystal has negative dielectric anisotropy.

FIG. 6 depicts an enhanced LCD 1000d including a fourth configuration of a patterned alignment structure that is variation on the embodiment of FIG. 5, in which the absence of strong alignment elements 1016a of the strong alignment layer 1016 is limited to the portions 1025 of the inter-electrode gaps 1026. Accordingly, each individual alignment element 1016a spans an entirety of an individual electrode element 1024, and there is an absence of individual alignment elements only at the portion 1025 of the inter-electrode gaps 1026 between adjacent individual electrode elements. In this manner, the patterning of the strong alignment layer bears similarity to the embodiment of FIG. 4, but with the patterned strong alignment layer 1016 being deposited on the additional weak alignment layer 1015. Similarly as with respect to FIG. 4, with this configuration the patterning of the alignment layer 1016 is such that there is no alignment layer in areas equidistant between the pixel electrode elements. The configuration of FIG. 6 may be preferred to that of FIG. 5 in configurations in which a width of the electrode elements 1024 is sufficiently small. Again, as the width of an electrode element becomes progressively smaller, the electrode center becomes closer to the electrode edges such that the weakening of the electric field at the electrode center relative to the electrode edges becomes minimal. With a stronger electric field across the entire electrode elements, the re-orientation of the LC molecules above the electrode element becomes more uniform. Consequently, it may be more cost effective to pattern only the alignment layer in the inter-electrode gaps as illustrated in FIG. 6.

For example, if the electrode width were 4 μm and the electrode gap were 3 μm, it may be necessary to pattern the strong type alignment layer (1016) as shown in FIG. 5. However, if the electrode width were 0.5 μm and the electrode gap were 3 μm, it may be sufficient to pattern the strong type alignment layer in a manner shown in FIG. 6. When the electrode gap is substantively smaller that the electrode width, it may be sufficient to pattern the strong alignment layer so that there are gaps in this alignment layer over the center of the electrodes while the alignment layer is continuous over the inter-electrode gap.

Figure 7:
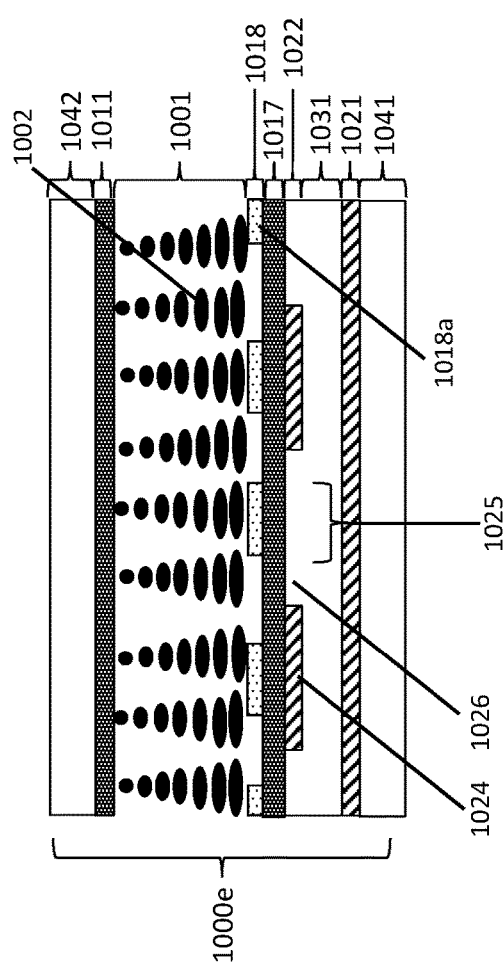
FIG. 7 is a schematic drawing depicting an enhanced LCD, including a fifth configuration of a patterned alignment structure.

FIG. 7 is a schematic drawing depicting an enhanced LCD 1000e, including a fifth configuration of a patterned alignment structure adjacent to the pixel electrode layer 1022. In the example of FIG. 7, the patterned alignment structure is configured as a dual alignment layer structure including an un-patterned, uniform and continuous strong alignment layer 1017 deposited on the pixel electrode layer 1022, and a patterned weak alignment layer 1018 including a plurality of weak alignment layer elements 1018a deposited on the strong alignment layer 1017. Accordingly, the un-patterned alignment layer has a stronger anchoring energy relative to a weaker anchoring energy of the patterned alignment layer. In this example, individual alignment elements 1018a of the patterned alignment layer 1018 do not span an electrode edge of an individual electrode element 1024 of the patterned pixel electrode layer 1022, and are present at the electrode centers and at portions 1025 of the inter-electrode gaps 1026.

In contrast to the embodiment of FIG. 5, the embodiment of FIG. 7 has only a single alignment layer at the electrode edges, which can be advantageous in providing stronger fringe fields. The electric field weakens rapidly with distance from the electrode layers, and thus having only the strong alignment layer 1017 adjacent to the LC layer at the electrode edges permits better application of the electric fields to the LC molecules. In other words, without the weak alignment layer elements 1018a at the electrode edges, there is less distance for the electric field to travel for effective re-orientation of the LC molecules. The result is that a smaller physical structure can be provided. Such configuration may be particularly beneficial for use in an LCD in which the liquid crystal has positive dielectric anisotropy, and the configuration also may be used in an LCD in which the liquid crystal has negative dielectric anisotropy.

Figure 8:
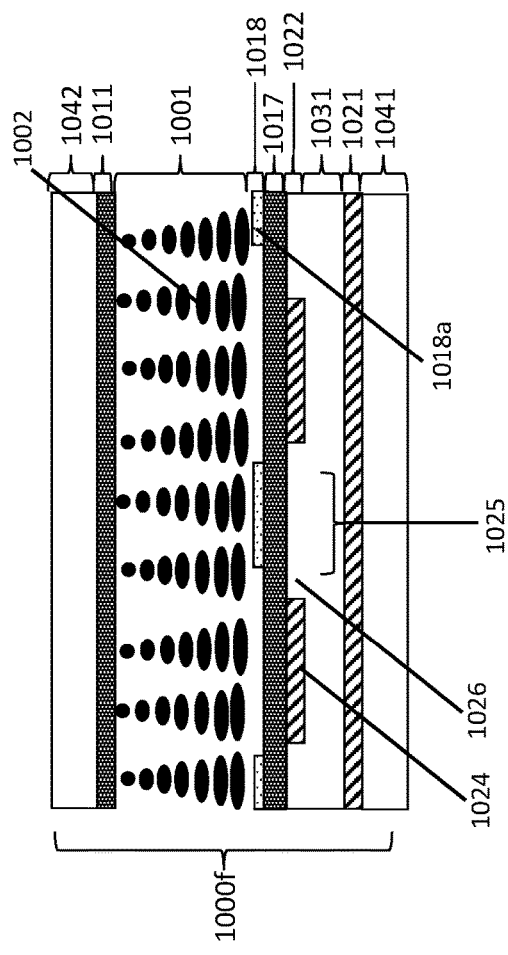
FIG. 8 is a schematic drawing depicting an enhanced LCD, including a sixth configuration of another patterned alignment structure.

FIG. 8 depicts an enhanced LCD 1000f including a sixth configuration of a patterned alignment structure that is variation on the embodiment of FIG. 7, in which the presence of weak alignment elements 1018a of the weak alignment layer 1018 is limited to the portions 1025 of the inter-electrode gaps 1026. Accordingly, in this example individual alignment elements 1018a of the patterned alignment layer 1018 further do not span a center of an individual electrode element 1024 of the patterned pixel electrode layer 1022. With this configuration, the patterning of the alignment layer is such that there is a weak alignment layer in areas equidistant between the pixel electrode elements. Similarly as in FIGS. 4 and 6, the configuration of FIG. 8 may be preferred to that of FIG. 7 in configurations in which a width of the electrode elements 1024 is sufficiently small, and thus the weakening of the electric field at the center of the electrode elements relative to the electrode edges becomes minimal.

For example, if the electrode width were 4 μm and the electrode gap were 3 μm, it may be necessary to pattern the weak type alignment layer (1018) as shown in FIG. 7. However, if the electrode width were 0.5 μm and the electrode gap were 3 μm, it may be sufficient to pattern the weak type alignment layer in a manner shown in FIG. 8. When the electrode gap is substantively smaller that the electrode width, it may be sufficient to pattern the weak type alignment layer so that such that the weak type alignment layer is positioned over the center of the electrode; in contrast to FIG. 8 in which the weak type alignment layer is centered over the inter electrode gap.

Figure 9:
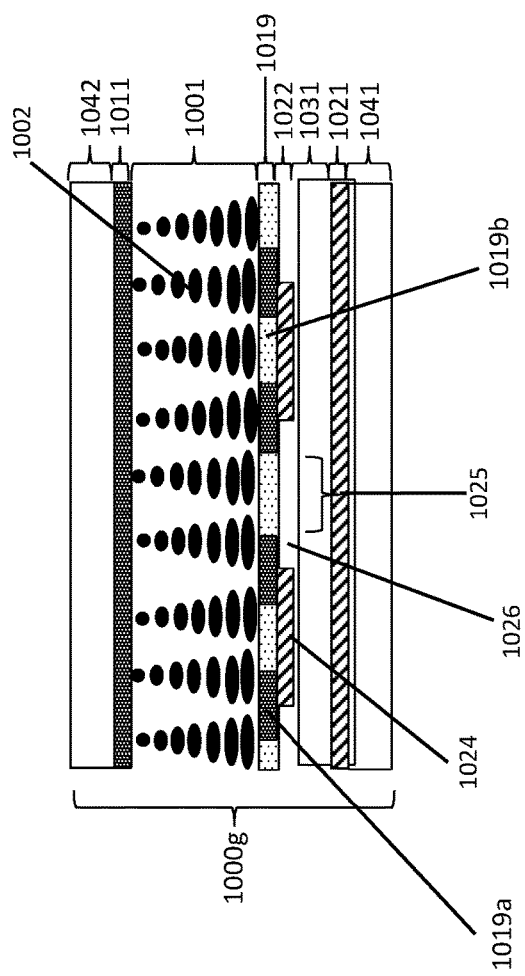
FIG. 9 is a schematic drawing depicting an enhanced LCD, including a seventh configuration of a patterned alignment structure.

FIG. 9 is a schematic drawing depicting an enhanced LCD 1000g, including a seventh configuration of a patterned alignment structure adjacent to the pixel electrode layer 1022. In the example of FIG. 9, the patterned alignment structure is configured as a single alignment layer 1019 including first anchoring energy elements 1019a interspersed with second anchoring energy elements 1019b, wherein the first anchoring energy elements have a first anchoring energy that is a stronger anchoring energy relative to a second anchoring energy of the second anchoring energy elements. In one example, the first anchoring energy elements have a strong anchoring energy as understood to those of ordinary skill in the art (on the order of $10^{-3}$ to $10^{-2}$ $J/m^2$ or more), and the second anchoring energy elements have a weak anchoring energy as understood to those of ordinary skill in the art (on the order of $10^{-3}$ to $10^{-6}$ $J/m^2$ or less). In an exemplary embodiment, the second anchoring energy elements have a zero anchoring energy. In another exemplary embodiment, the first anchoring energy elements have a weak non-zero anchoring energy as understood to those of ordinary skill in the art (on the order of $10^{-3}$ to $10^{-6}$ $J/m^2$ or less), and the second anchoring energy elements have a zero anchoring energy.

The alignment layer 1019 is patterned in such a way that each first anchoring energy element 1019a spans an edge of an individual electrode element 1024 of the patterned pixel electrode layer 1022, and the second anchoring energy elements are span the centers of the individual electrode elements and the portion 1025 of the inter-electrode gaps 1026. This configuration, therefore, also comports with the general principal of the various embodiments that stronger anchoring energy is present at the electrode edges while weaker anchoring energy is present at the electrode centers and/or portions of the inter-electrode gaps equidistant from electrode edges of adjacent electrodes. The configuration of FIG. 9, therefore, can achieve advantages of the dual layer configurations, but with utilizing only a single alignment layer which permits a smaller physical structure that is less costly to produce. Such configuration may be beneficial for use in an LCD in which the liquid crystal has positive dielectric anisotropy, and the configuration also may be used in an LCD in which the liquid crystal has negative dielectric anisotropy.

In this embodiment, the alignment layer 1019 may be made of a same or uniform material, with the patterning being formed by processing requisite portions of the alignment layer to set the first anchoring energy and the second anchoring energy. For example the patterning depicted in FIG. 9 may be formed by depositing an alignment layer with relatively strong anchoring energy and modifying the surface energy of the alignment layer in such a way as to weaken the anchoring energy in specific areas to be the second anchoring energy elements. Alternatively, the patterning may be formed by depositing an alignment layer with relatively weak anchoring energy and modifying the surface energy in such a way as to modify the anchoring energy in specific areas to be the first anchoring energy elements. As is known in the art, anchoring energy can be adjusted using a curing process that exposes the alignment layer material to polarized light. The amount of polarization provides for control of the strength of the alignment or anchoring energy. Another way of achieving patterned anchoring energy may be to deposit a photoalignment layer but to spatially modify the exposure to UV radiation. The UV patterning of anchoring energy may be performed using a UV lamp and photomask, or the UV patterning of anchoring energy may be performed using a raster scanned UV laser or interference effects. The patterned anchoring energy also may be achieved via a patterned rubbing process. The anchoring energy may be patterned in such a way that there is an abrupt transition from an area of weak anchoring energy to an area of strong anchoring energy, or the anchoring energy may be patterned in such a way that there is a smooth, graded transition from an area of weak anchoring energy to an area of strong anchoring energy.

Figure 10:
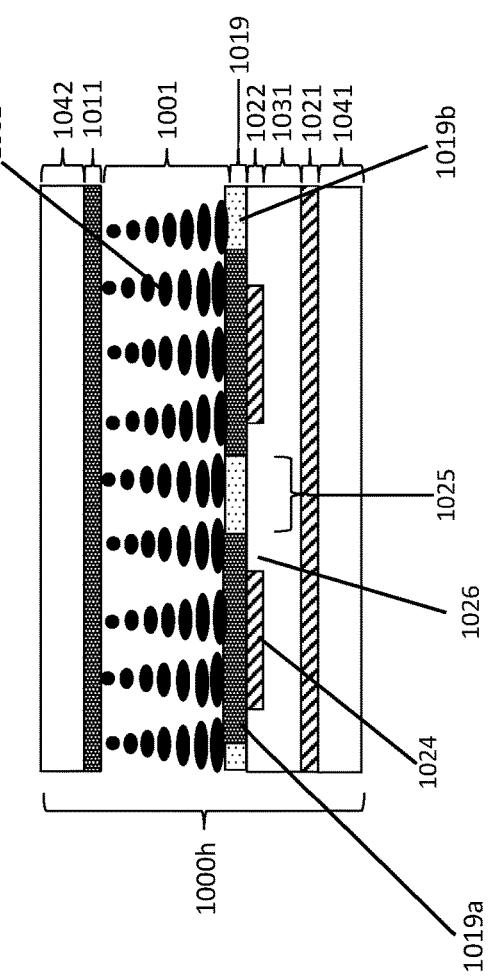
FIG. 10 is a schematic drawing depicting an enhanced LCD, including an eighth configuration of another patterned alignment structure.

FIG. 10 depicts an enhanced LCD 1000h including an eighth configuration of a patterned alignment structure that is variation on the embodiment of FIG. 9, in which the presence of the second anchoring energy elements of relatively weak anchoring energy is limited to the portions 1025 of the inter-electrode gaps 1026. Accordingly, each first anchoring energy element 1019a spans an entirety of an individual electrode element 1024, and the second anchoring energy elements 1019b span only the portion 1025 of the inter-electrode gaps 1026 between adjacent individual electrode elements. With this configuration, the patterning of the alignment layer is such that there is a weak alignment layer in areas equidistant between the pixel electrode elements. Similarly as in FIGS. 4, 6, and 8, the configuration of FIG. 10 may be preferred to that of FIG. 9 in configurations in which a width of the electrode elements 1024 is sufficiently small, and thus the weakening of the electric field at the center of the electrode elements relative to the electrode edges becomes minimal.

For example, if the electrode width were 4 μm and the electrode gap were 3 μm, it may be necessary to pattern the alignment layer (1019) as shown in FIG. 9. However, if the electrode width were 0.5 μm and the electrode gap were 3 μm, it may be sufficient to pattern the alignment layer in a manner shown in FIG. 10. When the electrode gap is substantively smaller that the electrode width, it may be sufficient to pattern the anchoring energy of the alignment layer so that the anchoring energy is weak over the center of the electrode; in contrast to FIG. 10 in which the anchoring energy is weak over the inter electrode gap.

Figure 11:
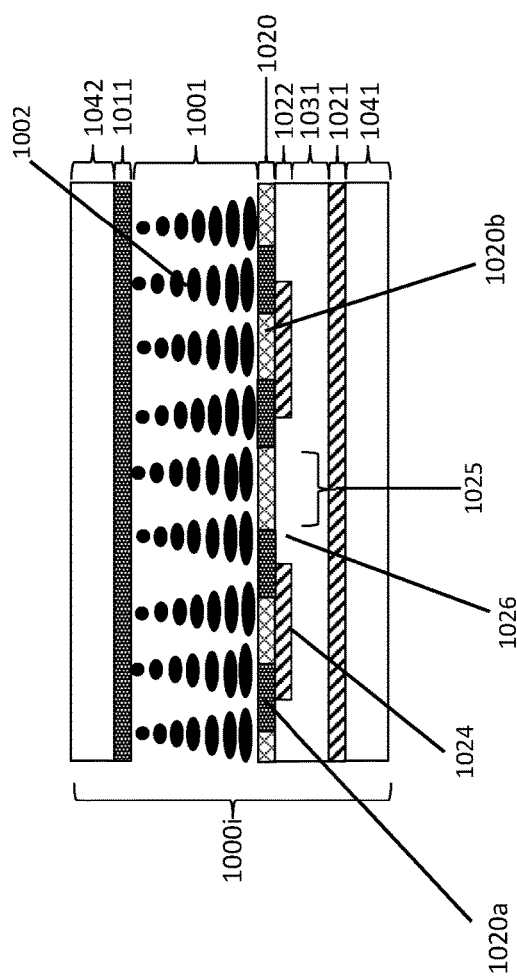
FIG. 11 is a schematic drawing depicting an enhanced LCD, including a ninth configuration of a patterned alignment structure.

FIG. 11 is a schematic drawing depicting an enhanced LCD 1000i, including a ninth configuration of a patterned alignment structure adjacent to the pixel electrode layer 1022. The example of FIG. 11 is similar to that of FIG. 9, in that the patterned alignment structure is configured as single alignment layer 1020 including first anchoring energy elements 1020a interspersed with second anchoring energy elements 1020b, wherein the first anchoring energy elements have a first anchoring energy that is a stronger anchoring energy relative to a second anchoring energy of the second anchoring energy elements. The embodiment of FIG. 11 differs from that of FIG. 9 in that the different anchoring energy elements are made of different materials, rather than being made of a same or uniform material that is subjected to different processing in different areas. Accordingly, the first anchoring energy elements 1020a and the second anchoring energy elements 1020b are made of different materials, and a material of the first anchoring energy elements has the first anchoring energy and a material of the second anchoring energy elements has the second anchoring energy.

To form the patterned structure, a first alignment layer of a material of the first anchoring energy elements is deposited. Portions of the first alignment layer then may etched away to form the first anchoring energy elements 1020a. A masking process is then used to deposit a second alignment layer material in the areas in in which the first alignment layer had been removed to form the second anchoring energy elements. This process may be reversed, with the second anchoring energy elements being formed prior to depositing material for the first anchoring energy elements. In addition, the different alignment layer materials may be processed in any of the ways described above with respect to FIG. 9, so as to achieve specific desired anchoring energies for the elements 1020a and 1020b.

Similarly as with the embodiment of FIG. 9, in the embodiment of FIG. 11, in one example the first anchoring energy elements have a strong anchoring energy as understood to those of ordinary skill in the art (on the order of $10^{-3}$ to $10^{-2}$ J/m$^2$ or more), and the second anchoring energy elements have a weak anchoring energy as understood to those of ordinary skill in the art (on the order of $10^{-3}$ to $10^{-6}$ J/m$^2$ or less). In an exemplary embodiment, the second anchoring energy elements have a zero anchoring energy. In another exemplary embodiment, the first anchoring energy elements have a weak non-zero anchoring energy as understood to those of ordinary skill in the art (on the order of $10^{-3}$ to $10^{-6}$ J/m$^2$ or less), and the second anchoring energy elements have a zero anchoring energy.

Also similarly as with the embodiment of FIG. 9, in the embodiment of FIG. 11 the alignment layer 1020 is patterned in such a way that the first anchoring energy elements 1020a span the electrode edges, and the second anchoring energy elements 1020b span the electrode centers and span the portions 1025 of the inter-electrode gaps 1026. This configuration, therefore, also comports with the general principal of the various embodiments that stronger anchoring energy is present at the electrode edges while weaker anchoring energy is present at the electrode centers and/or portions of the inter-electrode gaps equidistant from the electrode edges. The configuration of FIG. 11, therefore, can also achieve advantages of the dual layer configurations, but with utilizing only a single alignment layer which permits a smaller physical structure and is less costly to produce. Such configuration may be beneficial for use in an LCD in which the liquid crystal has positive dielectric anisotropy, and the configuration also may be used in an LCD in which the liquid crystal has negative dielectric anisotropy.

Figure 12:
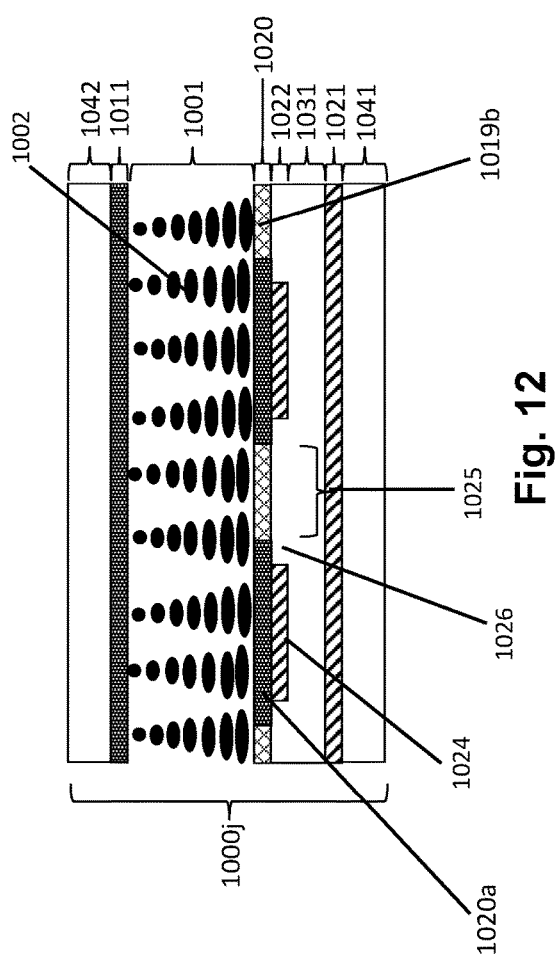
FIG. 12 is a schematic drawing depicting an enhanced LCD, including a tenth configuration of another patterned alignment structure.

FIG. 12 depicts an enhanced LCD 1000j including a tenth configuration of a patterned alignment structure that is variation on the embodiment of FIG. 9, in which the presence of the second anchoring energy elements of relatively weak anchoring energy is limited to the portions 1025 of the inter-electrode gaps 1026. Accordingly, each first anchoring energy element 1020a spans an entirety of an individual electrode element 1024, and the second anchoring energy elements 1020b span only the portion 1025 of the inter-electrode gaps 1026 between adjacent individual electrode elements. With this configuration the patterning of the alignment layer is such that there is a weak alignment layer in areas equidistant between the pixel electrode elements. Similarly as in FIGS. 4, 6, 8, and 10, the configuration of FIG. 12 may be preferred to that of FIG. 11 in configurations in which a width of the electrode elements 1024 is sufficiently small, and thus the weakening of the electric field at the center of the electrode elements relative to the edges becomes minimal.

For example, if the electrode width were 4 μm and the electrode gap were 3 μm it may be necessary to pattern the alignment layer (1020) as shown in FIG. 11. However, if the electrode width were 0.5 μm and the electrode gap were 3 μm, it may be sufficient to pattern the alignment layers in a manner shown in FIG. 12. When the electrode gap is substantively smaller that the electrode width, it may be sufficient to pattern the of the alignment layers so that the weak type alignment layer located over the center of the electrode; in contrast to FIG. 12 in which the weak type alignment layer located over the inter electrode gap.

Figure 13:
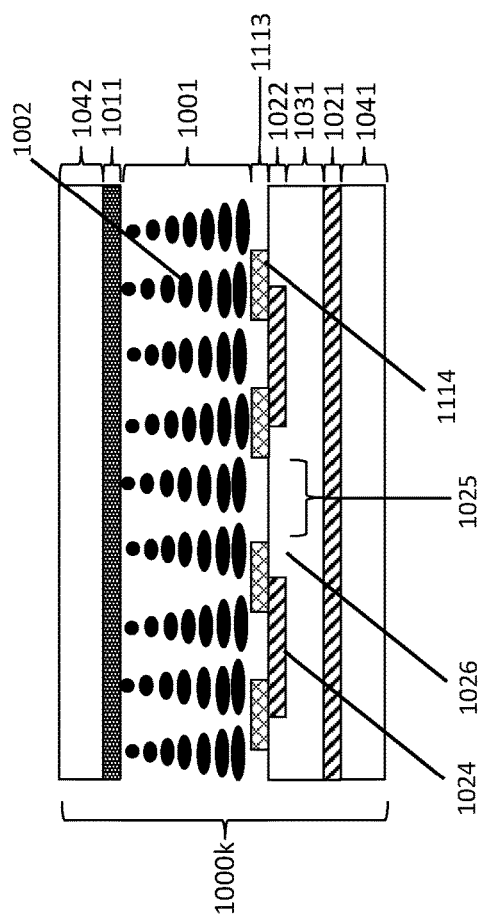
FIG. 13 is a schematic drawing depicting an enhanced LCD, including an eleventh configuration of a patterned alignment structure.

FIG. 13 is a schematic drawing depicting an enhanced LCD 1000k, including an eleventh configuration of a patterned alignment structure adjacent to the pixel electrode layer 1022. In the example of FIG. 13, the patterned alignment structure is configured as a single patterned alignment layer 1113. Specifically, the patterned alignment layer 1113 includes a plurality of alignment elements 1114. The patterned alignment layer 1113 may be a weak alignment layer in which each of the plurality of individual alignment elements 1114 has a non-zero weak anchoring energy as understood to those of ordinary skill in the art (on the order of $10^{-3}$ to $10^{-6}$ J/m² or less). The individual alignment elements are positioned above edges of the electrode elements 1024. There is no alignment layer or element thereof above either centers of the electrode elements 1024, nor above the portions 1025 of the inter-electrode gaps 1026. In exemplary embodiments, opposing boundaries of the portions 1025 of the inter-electrode gaps 1026 above which there is no alignment layer are equidistant from edges of adjacent electrodes 1024. Accordingly, the embodiment of FIG. 13 is comparable to that of FIG. 3, except in the embodiment of FIG. 13 a weak patterned alignment layer is utilized rather than a strong patterned alignment layer as in FIG. 3. The configuration of FIG. 13 still results in stronger anchoring energy being present above electrode edges as compared to a weaker anchoring energy present above electrode centers and/or above a portion of the inter-electrode gaps between adjacent electrode edges, so as to provide a weaker anchoring energy in regions in which the electric field tends to be weaker.

Figure 14:
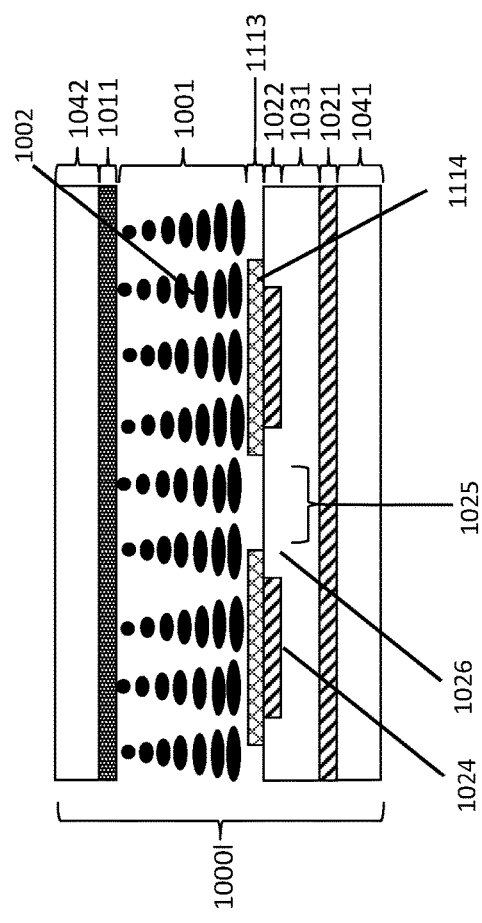
FIG. 14 is a schematic drawing depicting an enhanced LCD, including a twelfth configuration of another patterned alignment structure.

FIG. 14 depicts an enhanced LCD 10001 including a twelfth configuration of a patterned alignment structure that is variation on the embodiment of FIG. 13, in which the absence of alignment elements 1114 of the alignment layer 1113 is limited to the portions 1025 of the inter-electrode gaps 1026. With this configuration the patterning of the alignment layer is such that there is an absence of an alignment layer in areas equidistant between the pixel electrode elements. Similarly as in FIGS. 4, 6, 8, 10, and 12, the configuration of FIG. 14 may be preferred to that of FIG. 13 in configurations in which a width of the electrode elements 1024 is sufficiently small, and thus the weakening of the electric field at the center of the electrode elements relative to the edges becomes minimal.

For example, if the electrode width were 4 μm and the electrode gap were 3 μm, it may be necessary to pattern the alignment layer (1113) as shown in FIG. 13. However, if the electrode width were 0.5 μm and the electrode gap were 3 μm, it may be sufficient to pattern the alignment layer in a manner shown in FIG. 14. When the electrode gap is substantively smaller that the electrode width, it may be sufficient to pattern the of the alignment layers so that the weak type alignment layer located over the inter electrode gap; in contrast to FIG. 14 in which the weak type alignment layer located over the center of the electrode.

Figure 15:
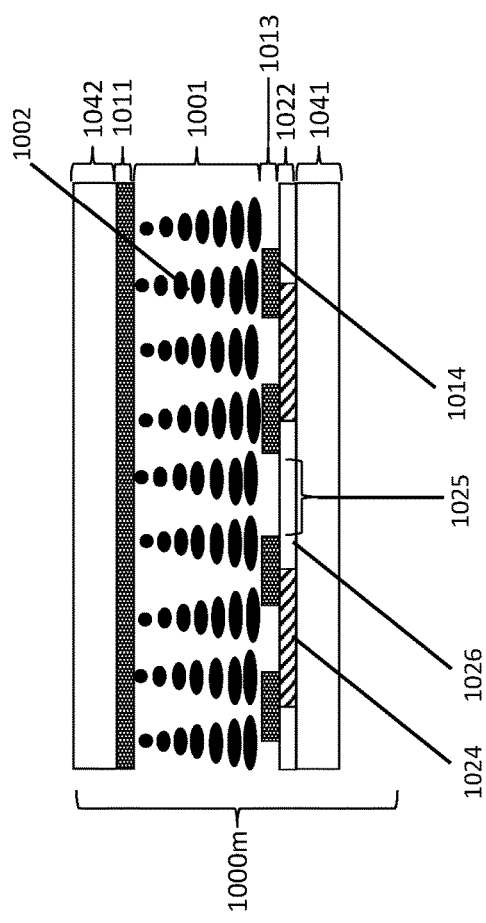
FIG. 15 is a schematic drawing depicting an enhanced LCD with a patterned alignment layer comparably as in FIG. 3, in which the LCD mode is an IPS mode
Figure 16:
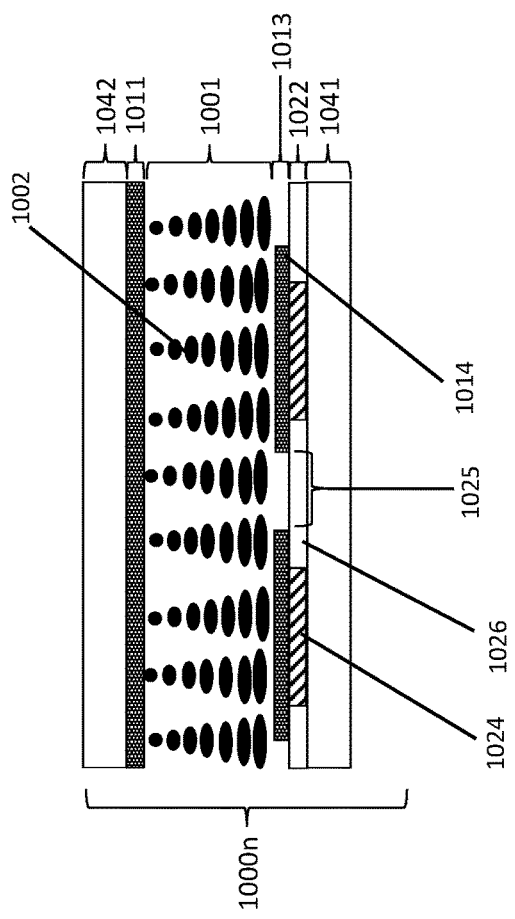
FIG. 16 is a schematic drawing depicting an enhanced LCD with a patterned alignment layer comparably as in FIG. 4, in which the LCD mode is an IPS mode.

Previous embodiments illustrate enhanced LCD devices in the context of fringe field switching (FFS) type electrode structures that employ the common or reference electrode 1021 spaced apart from the patterned pixel electrode layer 1022 to generate the desired electric fields. Comparable principles can be applied in like manner for in-plane switching (IPS) electrode configurations, in which a common or reference electrode is not employed, and the desired electric fields are generated only using the patterned pixel electrode layer 1022. Benefits of such principles to IPS modes may be realized in that IPS configurations are more susceptible to non-homogeneous reorientation of the LC molecules, an issue which has contributed at least in part to FFS modes becoming more common for use in many applications. The principles of the present invention, therefore, enhance the usability of IPS configurations. FIGS. 15 and 16 illustrate comparable patterning of the alignment layer for an IPS mode, and such patterning is comparable as in the FFS configurations as illustrated in FIGS. 3 and 4. The patterning shown in FIGS. 5-14 comparably can be adapted in a similar manner for IPS mode configurations.

Furthermore, as mentioned with reference to FIGS. 4, 6, 8, 10, 12 and 14, when the electrode gap is substantially smaller that the electrode width, it also may be sufficient to pattern the alignment layers so that the anchoring energy is weaker at the center of the electrode only, in contrast to other configurations in which the alignment layer is patterned so that the anchoring energy is weaker only over the inter-electrode gaps. Such variation is illustrated in FIG. 17 for an IPS configuration. The alignment layer(s) is(are) patterned so that the anchoring energy of the system is minimized over the center of the electrode to encourage the reorientation of the LC in these areas. This may be appropriate when the inter electrode-gap is substantively smaller than the electrode width. FIG. 17 represents an analogue to FIG. 4 except that the anchoring energy is weaker over the electrode centers rather than over inter-electrode gaps. The configurations of FIGS. 6, 8, 10, 12, 14 and 16 comparably may be adapted for IPS configurations with the additional feature of FIG. 17 that the anchoring energy is weaker over the electrode centers.

An aspect of the invention, therefore, is liquid crystal device (LCD) with improved brightness by the use of a patterned alignment structure. In exemplary embodiments, the LCD includes a liquid crystal (LC) layer; an electrode arrangement configured to apply an electric field to the LC layer, the electrode arrangement including a patterned electrode layer having a plurality of individual electrode elements and adjacent individual electrode elements are spaced apart from each other by an inter-electrode gap; and a patterned alignment structure that is deposited on the patterned electrode layer and is positioned to align LC molecules of the LC layer. The patterned alignment structure is configured such that a stronger anchoring energy is present at electrode edges of the individual electrode elements of the patterned electrode layer, as compared to a weaker anchoring energy present at electrode centers of the individual electrode elements and/or present at least at a portion of the inter-electrode gaps between adjacent individual electrode elements. The LCD may include one or more of the following features, either individually or in combination.

In an exemplary embodiment of the LCD, the patterned alignment structure comprises a patterned alignment layer including a plurality of individual alignment elements; adjacent individual alignment elements are spaced apart from each other; and each individual alignment element spans a respective edge of an individual electrode element of the patterned electrode layer, and there is an absence of individual alignment elements at the centers of the individual electrode elements and/or the portion of the inter-electrode gaps between adjacent individual electrode elements.

In an exemplary embodiment of the LCD, each individual alignment element spans an entirety of an individual electrode element, and there is an absence of individual alignment elements only at the portion of the inter-electrode gaps between adjacent individual electrode elements.

In an exemplary embodiment of the LCD, the patterned alignment layer is a strong alignment layer in which each of the plurality of individual alignment elements has an anchoring energy of at least $10^{-3}$ J/m$^2$.

In an exemplary embodiment of the LCD, the patterned alignment layer is a weak alignment layer in which each of the plurality of individual alignment elements has a non-zero anchoring energy of $10^{-3}$ J/m$^2$ or less.

In an exemplary embodiment of the LCD, the patterned alignment structure comprises a dual alignment layer structure comprising an un-patterned alignment layer and a patterned alignment layer; and the patterned alignment layer includes a plurality of individual alignment elements and adjacent individual alignment elements are spaced apart from each other.

In an exemplary embodiment of the LCD, the un-patterned alignment layer is deposited directly on the patterned electrode layer, and the patterned alignment layer is deposited directly on the un-patterned alignment layer on a side of the un-patterned alignment layer opposite from the patterned electrode layer.

In an exemplary embodiment of the LCD, the un-patterned alignment layer has a weaker anchoring energy relative to a stronger alignment energy of the patterned alignment layer; and each individual alignment element of the patterned alignment layer spans an edge of an individual electrode element of the patterned electrode layer, and there is an absence of individual alignment elements at the centers of the individual electrode elements and/or the portion of the inter-electrode gaps between adjacent individual electrode elements.

In an exemplary embodiment of the LCD, each individual alignment element spans an entirety of an individual electrode element, and there is an absence of individual alignment elements only at the portion of the inter-electrode gaps between adjacent individual electrode elements.

In an exemplary embodiment of the LCD, the un-patterned alignment layer has a stronger anchoring energy relative to a weaker anchoring energy of the patterned alignment layer; and individual alignment elements of the patterned alignment layer do not span an electrode edge of an individual electrode element of the patterned electrode layer.

In an exemplary embodiment of the LCD, individual alignment elements of the patterned alignment layer further do not span a center of an individual electrode element of the patterned electrode layer.

In an exemplary embodiment of the LCD, the patterned alignment structure comprises a single alignment layer including first anchoring energy elements interspersed with second anchoring energy elements, wherein the first anchoring energy elements have a first anchoring energy that is a stronger anchoring energy relative to a second anchoring energy of the second anchoring energy elements.

In an exemplary embodiment of the LCD, each first anchoring energy element of the alignment layer spans an edge of an individual electrode element of the patterned electrode layer, and the second anchoring energy elements of the alignment layer span the centers of the individual electrode elements and/or the portion of the inter-electrode gaps between adjacent individual electrode elements.

In an exemplary embodiment of the LCD, each first anchoring energy element spans an entirety of an individual electrode element, and the second anchoring energy elements span only the portion of the inter-electrode gaps between adjacent individual electrode elements.

In an exemplary embodiment of the LCD, the first anchoring energy elements and the second anchoring energy elements are made of a same material and subjected to different processing to set the first anchoring energy and the second anchoring energy.

In an exemplary embodiment of the LCD, the first anchoring energy elements and the second anchoring energy elements are made of different materials, and a material of the first anchoring energy elements has the first anchoring energy and a material of the second anchoring energy elements has the second anchoring energy.

In an exemplary embodiment of the LCD, the first anchoring energy elements have a strong anchoring energy of at least $10^{-3}$ J/m$^2$, and the second anchoring energy elements have a weak anchoring energy of $10^{-3}$ J/m$^2$ or less.

In an exemplary embodiment of the LCD, the second anchoring energy elements have a zero anchoring energy.

In an exemplary embodiment of the LCD, the first anchoring energy elements have a weak non-zero anchoring energy of $10^{-3}$ J/m$^2$ or less, and the second anchoring energy elements have a zero anchoring energy.

In an exemplary embodiment of the LCD, the LCD further includes an un-patterned alignment layer located on a side of the LC layer opposite from the patterned alignment structure.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many liquid crystal display devices in which a high brightness LCD device is desirable. Examples of such devices include mobile phones including smartphones, personal digital assistants (PDAs), and tablet, desktop, and laptop computers.

REFERENCE SIGNS LIST

1000-1000o liquid crystal devices (LCDs)
1001—liquid crystal (LC) layer
1002—liquid crystal molecules
1011—first alignment layer 1012—second alignment layer
1013—single patterned alignment layer
1014—individual alignment elements
1015—weak alignment layer
1016—patterned strong alignment layer
1016a—strong alignment layer elements
1017—strong alignment layer
1018—weak alignment layer
1018a—weak alignment layer elements
1019—single alignment layer
1019a—first anchoring energy elements
1019b—second anchoring energy elements
1020—single alignment layer
1020a—first anchoring energy elements
1020b—second anchoring energy elements
1021—common electrode layer
1022—patterned pixel electrode layer
1024—individual electrode elements
1025—portions of inter-electrode gaps
1026—inter-electrode gaps
1031—insulator layer
1041—thin film transistor (TFT) substrate
1042—color filter substrate
1113—single patterned alignment layer
1114—alignment elements

What is claimed is:

1. A liquid crystal device (LCD) comprising:
a liquid crystal (LC) layer;
an electrode arrangement configured to apply an electric field to the LC layer, the electrode arrangement including a patterned electrode layer having a plurality of individual electrode elements and adjacent individual electrode elements are spaced apart from each other by an inter-electrode gap; and
a patterned alignment structure that is deposited on the patterned electrode layer and is positioned to align LC molecules of the LC layer;
wherein the patterned alignment structure is configured such that a stronger anchoring energy is present at electrode edges of the individual electrode elements of the patterned electrode layer, as compared to a weaker anchoring energy present at electrode centers of the individual electrode elements and/or present at least at a portion of the inter-electrode gaps between adjacent individual electrode elements.

2. The LCD of claim 1, wherein:
the patterned alignment structure comprises a patterned alignment layer including a plurality of individual alignment elements;
adjacent individual alignment elements are spaced apart from each other; and
each individual alignment element spans a respective edge of an individual electrode element of the patterned electrode layer, and there is an absence of individual alignment elements at the centers of the individual electrode elements and/or the portion of the inter-electrode gaps between adjacent individual electrode elements.

3. The LCD of claim 2, wherein each individual alignment element spans an entirety of an individual electrode element, and there is an absence of individual alignment elements only at the portion of the inter-electrode gaps between adjacent individual electrode elements.

4. The LCD of claim 2, wherein the patterned alignment layer is a strong alignment layer in which each of the plurality of individual alignment elements has an anchoring energy of at least $10^{-3}$ J/m$^2$.

5. The LCD of any of claim 2, wherein the patterned alignment layer is a weak alignment layer in which each of the plurality of individual alignment elements has a non-zero anchoring energy of $10^{-3}$ J/m$^2$ or less.

6. The LCD of claim 1, wherein:
the patterned alignment structure comprises a dual alignment layer structure comprising an un-patterned alignment layer and a patterned alignment layer; and
the patterned alignment layer includes a plurality of individual alignment elements and adjacent individual alignment elements are spaced apart from each other.

7. The LCD of claim 6, wherein the un-patterned alignment layer is deposited directly on the patterned electrode layer, and the patterned alignment layer is deposited directly on the un-patterned alignment layer on a side of the un-patterned alignment layer opposite from the patterned electrode layer.

8. The LCD of claim 6, wherein:
the un-patterned alignment layer has a weaker anchoring energy relative to a stronger alignment energy of the patterned alignment layer; and
each individual alignment element of the patterned alignment layer spans an edge of an individual electrode element of the patterned electrode layer, and there is an absence of individual alignment elements at the centers of the individual electrode elements and/or the portion of the inter-electrode gaps between adjacent individual electrode elements.

9. The LCD of claim 8, wherein each individual alignment element spans an entirety of an individual electrode element, and there is an absence of individual alignment elements only at the portion of the inter-electrode gaps between adjacent individual electrode elements.

10. The LCD of claim 6, wherein:
the un-patterned alignment layer has a stronger anchoring energy relative to a weaker anchoring energy of the patterned alignment layer; and
individual alignment elements of the patterned alignment layer do not span an electrode edge of an individual electrode element of the patterned electrode layer.

11. The LCD of claim 10, wherein individual alignment elements of the patterned alignment layer further do not span a center of an individual electrode element of the patterned electrode layer.

12. The LCD of claim 1, wherein the patterned alignment structure comprises a single alignment layer including first anchoring energy elements interspersed with second anchoring energy elements, wherein the first anchoring energy elements have a first anchoring energy that is a stronger anchoring energy relative to a second anchoring energy of the second anchoring energy elements.

13. The LCD of claim 12, wherein each first anchoring energy element of the alignment layer spans an edge of an individual electrode element of the patterned electrode layer, and the second anchoring energy elements of the alignment layer span the centers of the individual electrode elements and/or the portion of the inter-electrode gaps between adjacent individual electrode elements.

14. The LCD of claim 13, wherein each first anchoring energy element spans an entirety of an individual electrode element, and the second anchoring energy elements span only the portion of the inter-electrode gaps between adjacent individual electrode elements.

15. The LCD of claim 12, wherein the first anchoring energy elements and the second anchoring energy elements are made of a same material and subjected to different processing to set the first anchoring energy and the second anchoring energy.

16. The LCD of claim 12, wherein the first anchoring energy elements and the second anchoring energy elements are made of different materials, and a material of the first anchoring energy elements has the first anchoring energy and a material of the second anchoring energy elements has the second anchoring energy.

17. The LCD of claim 12, wherein the first anchoring energy elements have a strong anchoring energy of at least $10^{-3}$ J/m$^2$, and the second anchoring energy elements have a weak anchoring energy of $10^{-3}$ J/m$^2$ or less.

18. The LCD of claim 17, wherein the second anchoring energy elements have a zero anchoring energy.

19. The LCD of claim 12, wherein the first anchoring energy elements have a weak non-zero anchoring energy of $10^{-3}$ J/m$^2$ or less, and the second anchoring energy elements have a zero anchoring energy.

20. The LCD of claim 1, wherein the LCD further comprises an un-patterned alignment layer located on a side of the LC layer opposite from the patterned alignment structure.

* * * * *